United States Patent
Barclay et al.

(10) Patent No.: US 6,758,046 B1
(45) Date of Patent: Jul. 6, 2004

(54) SLUSH HYDROGEN PRODUCTION METHOD AND APPARATUS

(75) Inventors: John A. Barclay, Madison, WI (US); Steven R. Jaeger, Madison, WI (US); Peter J. Claybaker, Madison, WI (US); Carl B. Zimm, Madison, WI (US); Steven F. Kral, Madison, WI (US)

(73) Assignee: Astronautics Corporation of America, Milwaukee, WI (US)

(*) Notice: Subject to any disclaimer, the term of this patent is extended or adjusted under 35 U.S.C. 154(b) by 1826 days.

(21) Appl. No.: 07/237,952

(22) Filed: Aug. 22, 1988

(51) Int. Cl.[7] .............................................. F25B 21/00
(52) U.S. Cl. ................................ 62/3.1; 62/56; 62/115; 62/123; 62/340; 62/345; 62/914
(58) Field of Search .......................... 62/3.1, 10, 76, 62/56, 115, 125, 340, 345, 914

(56) References Cited

U.S. PATENT DOCUMENTS

| | | | |
|---|---|---|---|
| 2,510,800 A | | 6/1950 | Chilowsky ................. 171/125 |
| 2,619,603 A | | 11/1952 | Chilowsky ..................... 310/4 |
| 2,648,784 A | | 8/1953 | Chilowsky ..................... 310/4 |
| 3,108,444 A | | 10/1963 | Kahn ............................... 62/3 |
| 3,121,265 A | | 2/1964 | Hoh ............................... 20/62 |
| 3,154,927 A | | 11/1964 | Simon ............................. 62/3 |
| 3,393,526 A | | 7/1968 | Pearl ............................... 62/3 |
| 3,413,814 A | | 12/1968 | Van Geuns ................... 62/3.1 |
| 3,743,866 A | | 7/1973 | Pire ........................... 310/306 |
| 3,774,404 A | | 11/1973 | Walker et al. ................. 62/3.1 |
| 3,841,107 A | | 10/1974 | Clark ............................ 62/3.1 |
| 3,994,141 A | * | 11/1976 | Schrawer et al. ............... 62/76 |
| 4,009,013 A | * | 2/1977 | Schrawer et al. ............... 62/10 |
| 4,015,437 A | * | 4/1977 | Daus et al. ...................... 62/76 |
| 4,033,734 A | | 7/1977 | Steyert, Jr. et al. ............ 62/3.1 |
| 4,069,028 A | | 1/1978 | Brown .......................... 62/3.1 |
| 4,107,935 A | | 8/1978 | Steyert, Jr. .................... 62/3.1 |
| 4,332,135 A | | 6/1982 | Barclay et al. ................ 62/3.1 |
| 4,339,252 A | * | 7/1982 | Bell et al. ....................... 62/10 |
| 4,386,950 A | * | 6/1983 | Bell et al. ....................... 62/10 |
| 4,408,463 A | | 10/1983 | Barclay et al. ................ 62/3.1 |

(List continued on next page.)

OTHER PUBLICATIONS

T.P. Bernat, et al., Automated Flux Pump for Energizing High Current Superconducting Loads, Rev. Sci. Instrum., vol. 46, No. 5, May 1975, pp. 582–585.

(List continued on next page.)

Primary Examiner—Stephen J. Lechert, Jr.
(74) Attorney, Agent, or Firm—Foley & Lardner

(57) ABSTRACT

A slush hydrogen production device (10) utilizes a hydrogen slushifier magnetic refrigerator (30) having a wheel (50) of material exhibiting the magnetocaloric effect. The wheel is rotated through a magnetic field of varying intensity around the circumference of a wheel housing (36) created by the windings of superconductive magnets (56). The material of the wheel (50) follows a magnetic Carnot cycle as the wheel rotates (36) through regions of low temperature heat transfer and high temperature heat transfer. Liquid hydrogen is supplied to the regions of low and high temperature heat transfer through inlet pipes (39 and 42). Gaseous hydrogen is produced in the high temperature heat transfer region and vented away by an outlet pipe (48). Solid hydrogen is produced in the low temperature heat transfer region by direct solidification upon the magnetic wheel (50); and is removed by scrapers (76) and deposited in a compartment (26) where it mixes with liquid hydrogen to form slush hydrogen. A second magnetic refrigerator (108) may be used to keep its magnets and the magnets of the hydrogen slushifier magnetic refrigerator (30) at a temperature region suitable to maintain superconductivity. The slush hydrogen production device (10) may be part of a larger operating system that includes a liquid hydrogen storage tank (146), a slush hydrogen storage tank (136), a slush conditioner (148) and appropriate connective plumbing.

49 Claims, 7 Drawing Sheets

U.S. PATENT DOCUMENTS

| | | | |
|---|---|---|---|
| 4,441,325 A | 4/1984 | Bon-Mardion et al. | 62/3.1 |
| 4,457,135 A | 7/1984 | Hakuraku et al. | 62/3.1 |
| 4,459,811 A | 7/1984 | Barclay et al. | 62/3.1 |
| 4,464,903 A | 8/1984 | Nakagome et al. | 62/3.1 |
| 4,507,927 A | 4/1985 | Barclay | 62/467 |
| 4,507,928 A | 4/1985 | Johnson | 62/3.1 |
| 4,599,866 A | 7/1986 | Nakagome et al. | 62/3 |
| 4,642,994 A | 2/1987 | Barclay et al. | 62/3.3 |
| 4,702,090 A | 10/1987 | Barclay et al. | 62/3.3 |
| 4,704,871 A * | 11/1987 | Barclay et al. | 62/3.1 |

OTHER PUBLICATIONS

Y. Hakuraku, et al., "Conceptual Design of a New Magnetic Refrigerator Operating between 4K and 20K," Japanese Journal of Applied Physics, vol. 24, No. 11, Nov., 1985, pp. 1548–1551.

Magnetic Refrigeration: The Basis for a New Refrigeration Technology, Los Alamos Laboratory Mini-Review, LALP–82–34, Nov., 1982.

J.A. Barclay, et al., "Experimental Results on a Low Temperature Magnetic Refrigerator," Adv. in Cryogenic Engineering 31, 743 (1986).

Y. Hakuraku, et al., "A Magnetic Refrigerator for Superfluid Helium Equipped with a Rotating Magnetic System," Japanese Journal of Applied Physics, vol. 25, No. 1, Jan., 1986, pp. 140–146.

Y. Hakuraku, et al., A Rotary Magnetic Refrigerator for Superfluid Helium Production, J. Appl. Phys. 60 (9), Nov. 1, 1986, pp. 3266–3268.

J.A. Barclay, et al., Magnetic Refrigeration for 4–20K Applications Los Alamos National Laboratory Report LA UR–84–540, Dec., 1983, Flight Dynamics Laboratory, Air Force Wright Aeronautical Laboratori Report AFWAL–TR–83–3210, Air Force Systems Command Wright–Patterson Air Force Base, Ohio, 54533 (this report is subject to export contro laws).

Patent Application Ser. No. 848,001, by John A. Barclay, Walter F. Stewart, Michael D. Henke, and Kenneth E. Kalash, entitled "Magnetic Refrigeration Appartus with Belt of Ferro or Paramagnetic Material", filed with United States Patent and Trademark Office in 1986.

G.J. Caras, "Slush Hydrogen," RSIC–288, Redstone Scientific Information Center, Sep. 22, 1964.

D.E. Daney, et al., "Preliminary Hydrogen Freezing Studies," U.S. Department of Commerce, NBSIR 73–339, Cryogenics Division, Institute for Basic Standards, National Bureau of Standards, Oct. 1973, pp. 1–33, p. 278.

A.S. Rapial, et al., Preparation and Characterization of Slush Hydrogen and Nitrogen Gels, U.S. Department of Commerce, Technical Note 378, Cryogenics Division, Institute for Basic Standards, National Bureau of Standards, May 1969, pp. 4–18.

C.F. Sindt, et al., "Heat and Transfer and Mixing of Slush Hydrogen," U.S. Department of Commerce, NBSIR 73–344, Cryogenic Division, Institute for Basic Standards, National Bureau of Standards, Nov. 1973.

* cited by examiner

SLUSH HYDROGEN PRODUCTION METHOD AND APPARATUS

FIELD OF THE INVENTION

This invention pertains generally to the production, maintenance, and storage of slush hydrogen, and particularly to the production of slush hydrogen by magnetic refrigeration.

BACKGROUND OF THE INVENTION

Slush hydrogen is an equilibrium mixture of solid and liquid hydrogen that exists on the solid-liquid line of hydrogen, e.g., at conditions of 13.8 K and 7.033 KPa (1.02 psia). Slush hydrogen has a greater density and lower enthalpy than hydrogen in its liquid state, and these properties make slush hydrogen an attractive alternative to liquid hydrogen in applications such as for a propellant in aerospace vehicles. The greater density of slush hydrogen as compared to liquid hydrogen allows for volume savings in the propellant, resulting in a smaller tank and a corresponding increase in payload to gross take-off weight ratio and a reduction of airframe size and weight. The lower enthalpy results in greater heat sink capacity for a given hydrogen mass to absorb engine and aerodynamic heat loads.

Several methods of producing slush hydrogen have been suggested in the prior art. These include vacuum pumping, helium gas refrigerator cooling, Joule-Thomson cooling of a helium-hydrogen gas mixture, and helium gas-injection cooling.

The vacuum pumping method may be of several varieties. One variation of the vacuum pumping method is straight vacuum pumping, where evaporation of some of the liquid from a storage tank provides the refrigeration to reduce the temperature of the remaining liquid to the freezing point and then, by continued evaporation, to produce mixtures of solid and liquid or to completely freeze the remaining hydrogen. A second variation of the vacuum pumping method is semiflow vacuum pumping. In the vacuum pumping of the semiflow variety, saturated liquid hydrogen, at one atmosphere, supplied from a transport vessel is first expanded through a Joule-Thomson valve into an evacuated tank held at a pressure slightly above the triple point, and then is vacuum pumped in that tank until the desired slush quality is obtained. Vacuum pumping methods can lose up to 15% of the liquid hydrogen during slush hydrogen production and require a subatmospheric tank pressure, which is conducive to atmospheric leaks and thus the formation of explosive mixtures in the tank.

A second method of producing slush hydrogen is by means of a helium gas refrigerator, which can be performed in either a batch or a flow process. This method has an advantage over the vacuum pumping techniques in that no hydrogen is lost during production. However, this method requires more costly and complex equipment installation.

A third method of producing slush hydrogen is Joule-Thomson cooling of a helium-hydrogen gas mixture.

In this process, the gas mixture is precooled by a regenerative heat exchanger and then passed through a Joule-Thomson expansion valve to achieve the desired quality slush hydrogen as the condensed phase with a helium-hydrogen vapor phase. The slush is withdrawn from the production vessel, and the helium-hydrogen vapor is recirculated. Hydrogen is added to the process stream to replace the hydrogen withdrawn as slush. Joule-Thomson cooling can be operated at or above atmospheric pressure and therefore eliminates the need for evacuable storage vessels and vacuum pumps. The main disadvantage of this method is that it accomplishes essentially the same results as vacuum pumping, but with added capital and operating costs.

In another method, helium gas is injected into a bath of liquid hydrogen. The temperature of the liquid hydrogen is lowered as a result of the vaporization of a portion of the liquid hydrogen into the bubbles of non-condensing helium as they rise through the liquid hydrogen. The cooling achieved by this process is dependent upon the amount of liquid which is vaporized and carried from the bath by the flow of the injected helium gas. The large helium volume required for this process causes the helium injection method to have a very high operating cost.

The above methods of producing slush hydrogen typically operate at approximately 10% of the Carnot efficiency. These systems require large volumes and weights for pumps, compressors, and other equipment; for example, in a 1 Kw at 12 K unit, the helium gas refrigerator occupies about 35 $m^3$ in size and weighs about 1800 kg. Some methods leave contaminants in the slush hydrogen and/or hydrogen exhaust gas. For example, the vacuum pumping technique results in oil vapor in the hydrogen exhaust. Such contaminants are a major source of fouling in the Joule-Thomson expansion valves.

SUMMARY OF THE INVENTION

In accordance with the present invention, a slush hydrogen production device includes an insulated tank which encloses a hydrogen slushifier magnetic refrigerator, i.e. a magnetic refrigerator which is used to cool and solidify hydrogen. The hydrogen slushifier magnetic refrigerator provides cooling at or about 12 K while rejecting heat at or about 21 K. The vacuum insulated tank of hydrogen is divided into two regions by the vacuum enclosure around the magnetic refrigerator. The first or upper compartment contains an ullage space of gaseous hydrogen and primarily liquid hydrogen which is used as a heat sink by the hydrogen slushifier magnetic refrigerator, with the slushifier refrigerator being located within the evacuated partition. The second or lower region of the hydrogen vessel contains the slush hydrogen. Liquid hydrogen migrates between the regions to supply make-up hydrogen for that converted to solid and removed as slush. Stratification will generally occur in the lower region with liquid hyrdrogen at 20.2 K near the top of the lower region and near 13.8 K liquid hydrogen further down in the lower region, and slush hydrogen near the bottom of the tank.

During operation, the hydrogen slushifier magnetic refrigerator requires electric power and two flows of liquid hydrogen, and produces gaseous hydrogen and solid hydrogen. One flow of liquid hydrogen is used to remove heat from the slushifier magnetic refrigerator. The flow leaves the upper compartment and passes through a pipe to the magnetic refrigerator slushifier. The hydrogen is vaporized, absorbing heat from the refrigerator, and is returned to the upper compartment as a gas, via another pipe. The gaseous hydrogen leaves the hydrogen vessel at near 21 K through a pipe exiting the vessel. The second flow of liquid hydrogen is a thermal load at near but above 13.8 K which enters the refrigerator from the lower compartment via an insulated pipe. The hydrogen slushifier magnetic refrigerator solidifies the second flow of liquid hydrogen at 13.8 K, and the solidified hydrogen flows and falls back into the lower compartment, increasing the solid concentration in the hydrogen as it mixes with the liquid hydrogen. When the solid concentration becomes near 50%, the slush hydrogen is pumped to an independent storage tank at the rate that it is formed, and is replaced by liquid hydrogen which flows from the top region to the lower region of the hydrogen container. The feed liquid hydrogen is gradually cooled from near 20.2 K to near 13.8 K by direct contact heat exchange in the stratification layer of liquid hydrogen.

The hydrogen slushifier magnetic refrigerator utilizes the magnetocaloric effect by which certain magnetic materials increase in temperature when placed in a magnetic field and decrease in temperature when removed from the field. The slushifier refrigerator includes a wheel of paramagnetic or ferromagnetic material which rotates to bring all points on the wheel periodically into and out of a strong magnetic field produced by superconducting magnets. When entering the magnetic field at a high temperature heat transfer region, the magnetic material in the wheel increases in temperature and rejects heat by the vaporization of liquid hydrogen flowing from the upper compartment; the vaporized hydrogen is then vented back to the upper compartment. When a portion of the wheel leaves the magnetic field, it decreases in temperature and passes to a low temperature heat transfer region where liquid hydrogen at near 13.8 K from the lower compartment freezes directly upon the wheel. The solidified hydrogen is then removed from the wheel and allowed to fall to the bottom of the lower compartment, forming slush hydrogen.

The superconducting magnets are preferably formed as solenoids disposed so that the magnetic wheel rotates through the bores of the magnets. The magnetic field is varied about the periphery of the magnetic wheel by selective placement of the magnets and by altering the number of windings from magnet to magnet. The magnetic wheel is driven to rotate through the variable magnetic field by an electric motor located outside of the vacuum insulated tank, the wheel being supported along its periphery by bearings. The solid hydrogen is removed from the wheel in the low temperature heat transfer region by a rotary scraper that is also driven by the electric motor, the solid hydrogen falling to the bottom of the lower. compartment in the vacuum insulted tank to form slush.

A second, smaller magnetic refrigerator is preferably employed to keep its own magnets and the magnets of the hydrogen slushifier magnetic refrigerator well below the superconducting transition temperature. For initial start-up, a gaseous helium expansion precooler is used to cool the magnets of the hydrogen slushifier refrigerator and the magnets of the second refrigerator to the appropriate temperature range. Once the magnets are appropriately cooled, the magnets can be energized and the precooler can be shut off.

The use of magnetic refrigeration to produce slush hydrogen offers high reliability, ease of use, and ease of maintenance because a minimum number of relatively slow moving parts are required. The magnetic refrigerator slushifier of the present invention operates near 40% of the Carnot-efficiency and provides a stand-alone device for in-situ production and maintenance of hydrogen slush that is of small volume and weight; for example, a 1 kW at 12 kg unit occupies approximately 1 $m^3$ and has a mass of 350 kg. All external connections of the slushifier magnetic may be at atmospheric pressure, there is no need for large quantities of gaseous helium, and no contaminants are left in the slush hydrogen product or gaseous hydrogen exhaust.

Further objects, features, and advantages of the invention will be apparent from the following detailed description when taken in conjunction with the accompanying drawings.

DESCRIPTION OF THE PREFERRED EMBODIMENT

Figure 1:
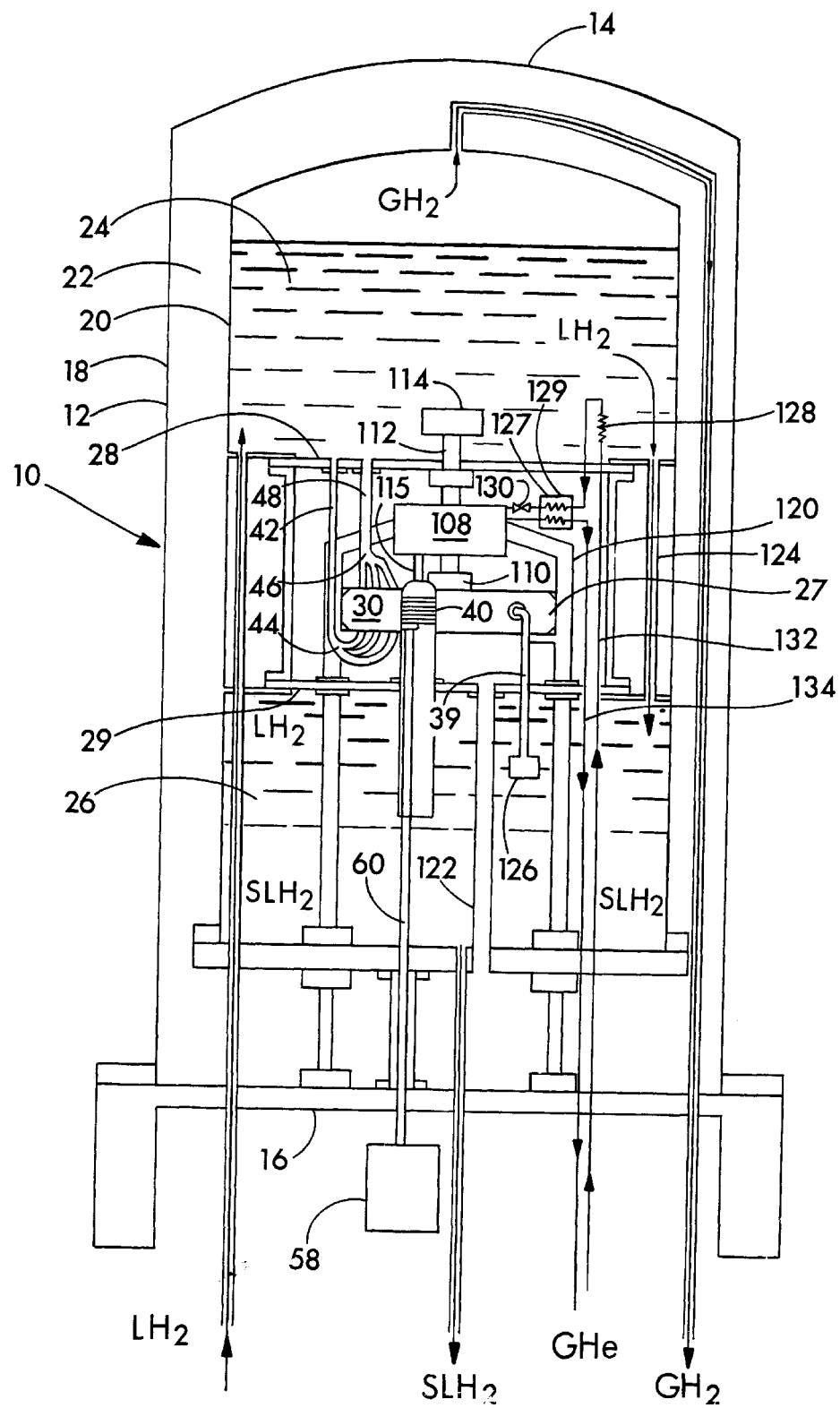
FIG. 1 is a partially schematic cross-section view of the slush hydrogen production device of the invention.
Figure 2:
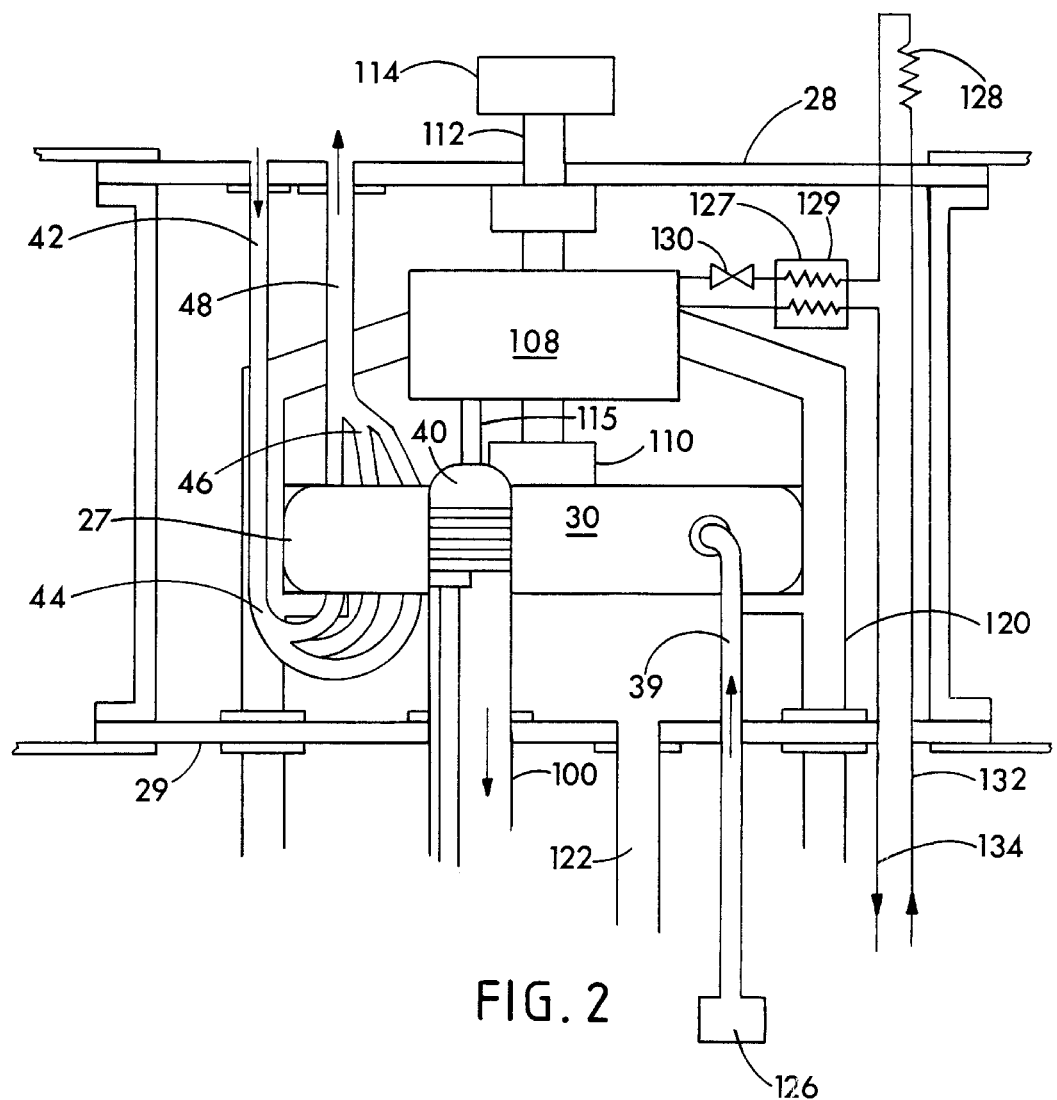
FIG. 2 is a partially schematic view of the slushifier assembly portion of the slush hydrogen production device.

With reference to the drawings, the slush hydrogen production device of the present invention is shown generally at 10 in FIG. 1, a partially pictorial and partially schematic representation of the device. The slush hydrogen production device 10 is enclosed within a vacuum insulated tank 12, the vacuum insulated tank 12 being generally cylindrical in shape and having a top 14 and a bottom 16. Other geometries for the vacuum insulated tank 12 may also be used. The vacuum insulated tank 12 is bounded by an outer shell 18; the vacuum insulated tank 12 also has an inner shell 20 and a space between the outer shell 18 and the inner shell 20, the space 22 being evacuated to form an insulating dewar. Superinsulation (not shown) may also be wrapped around the inner shell. The interior of the inner shell of the vacuum insulated tank 12 has an upper compartment 24, a lower compartment 26, and a slushifier assembly 27 with upper and lower partitions 28 and 29 separating the upper compartment 24 from the lower compartment 26. The slushifier assembly 27 contains a hydrogen slushifier magnetic refrigerator 30, that is, a magnetic refrigerator applied to the task of producing solidified hydrogen which can be mixed with liquid hydrogen to form slush hydrogen. FIG. 2 shows an enlarged schematic view of the slushifier assembly 27.

Figure 3:
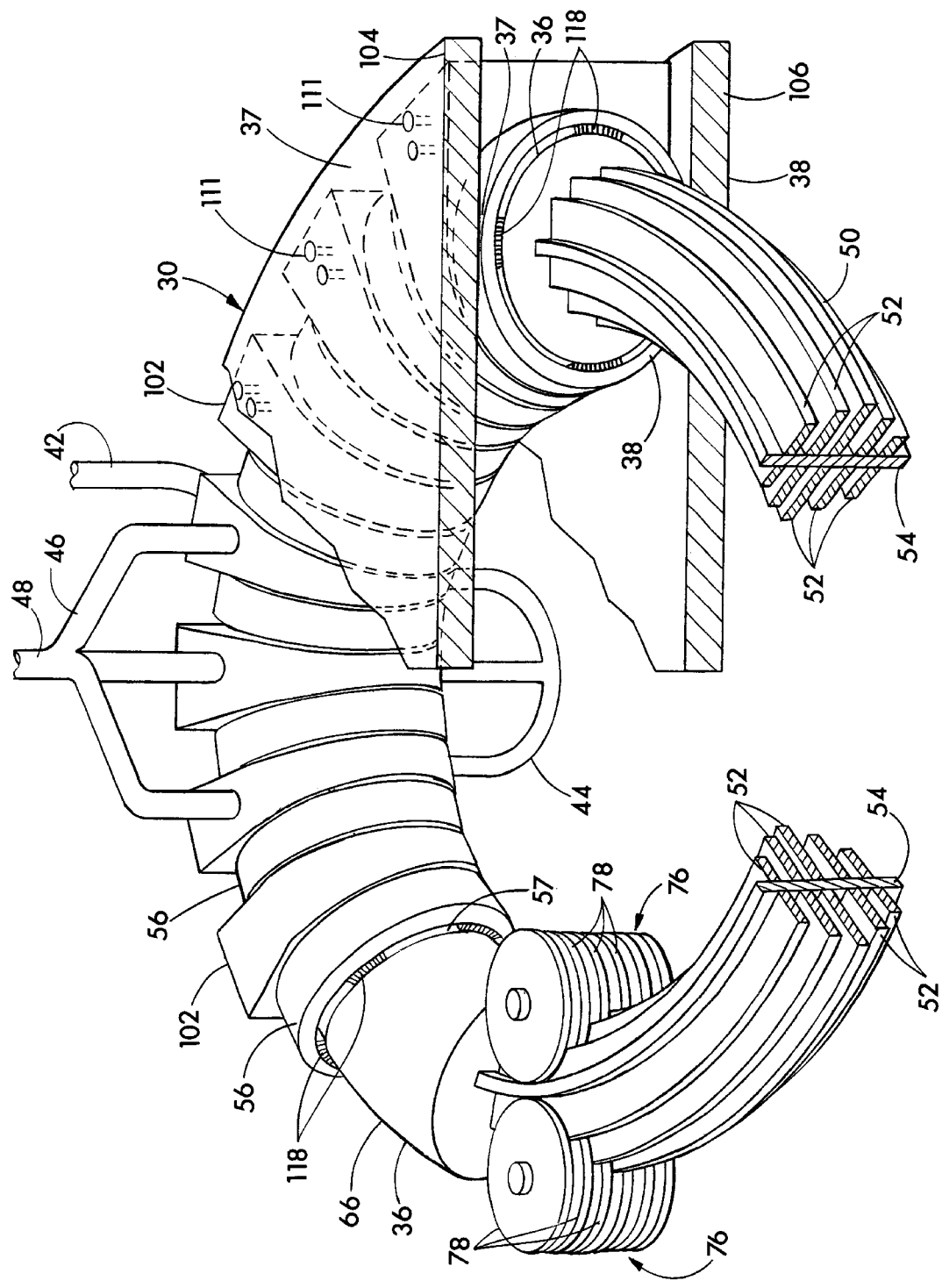
FIG. 3 is a perspective view of the hydrogen slushifier magnetic refrigerator without the removal chamber and drive system, and with the magnet support disks being cut away to show the magnets, spacers, and the low conductance standoffs, some of the magnets being removed for aid in illustrating the principals of the inventon.

The hydrogen slushifier magnetic refrigerator 30 includes a torus-shaped housing 36 having a top 37 and a bottom 38, as best shown in FIG. 3. With reference to FIGS. 1 and 2, liquid hydrogen is introduced to the slushifier magnetic refrigerator 30 through an inlet 39 from the lower compartment 26, and the solid hydrogen is removed from the slushifier magnetic refrigerator 30 a removal chamber 40. Solid hydrogen is allowed to fall to the lower compartment 26 through the removal chamber 40. Liquid hydrogen also enters the slushifier refrigerator 30 through an insulated inlet pipe 42 that leads from the upper compartment 24, the inlet pipe 42 branching into a manifold 44 that enters the hydrogen slushifier 30 in the bottom 38 of the housing 36. This liquid hydrogen is partially boiled off to form gaseous hydrogen, and the gaseous hydrogen is vented into a manifold 46 in the top of the housing 36 that leads further to an insulated outlet pipe 48 that converges to the upper compartment 24.

Figure 4:
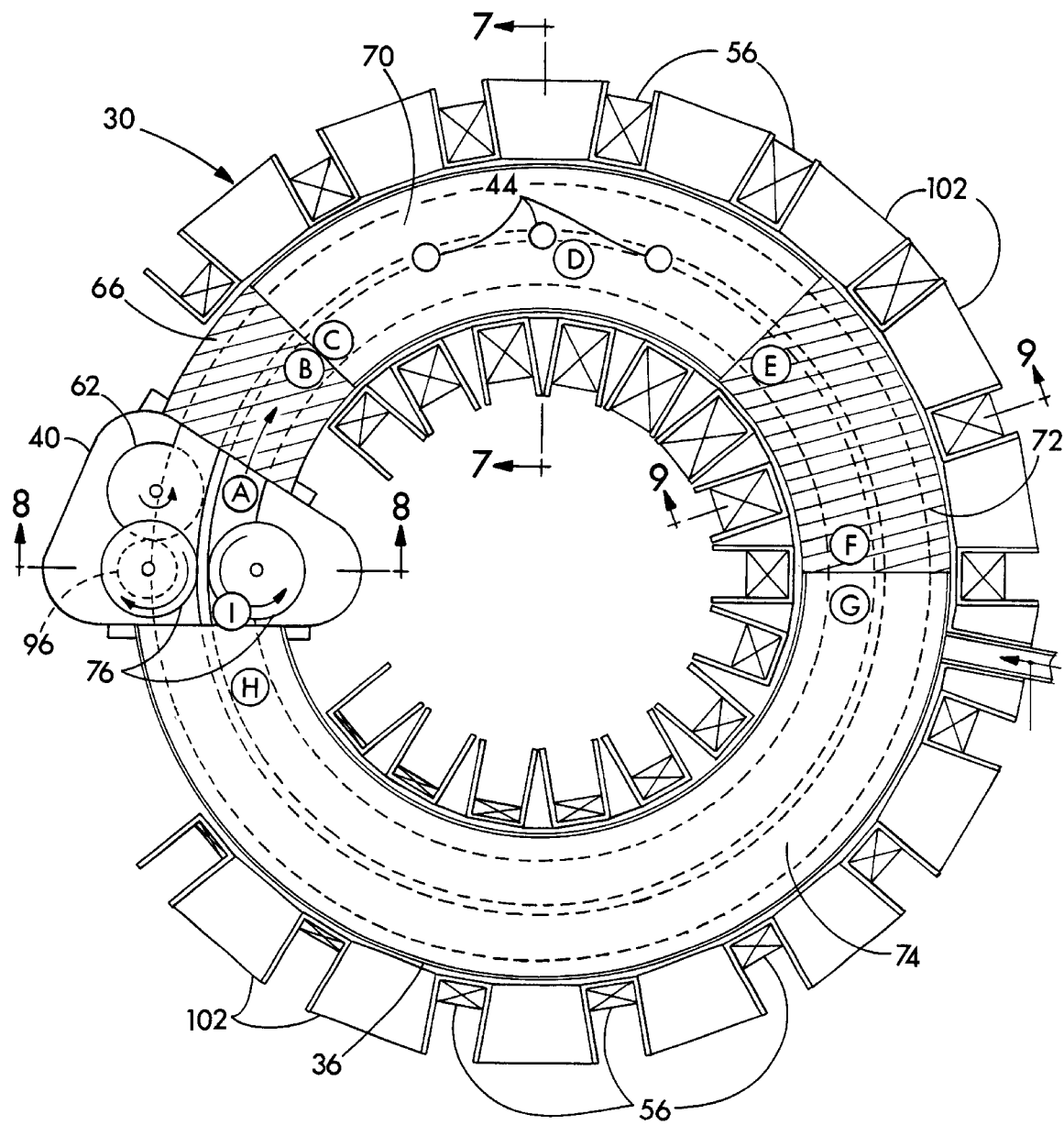
FIG. 4 is a cross-sectional view showing the bottom one-half of the slushifier magnetic refrigerator.
Figure 7:
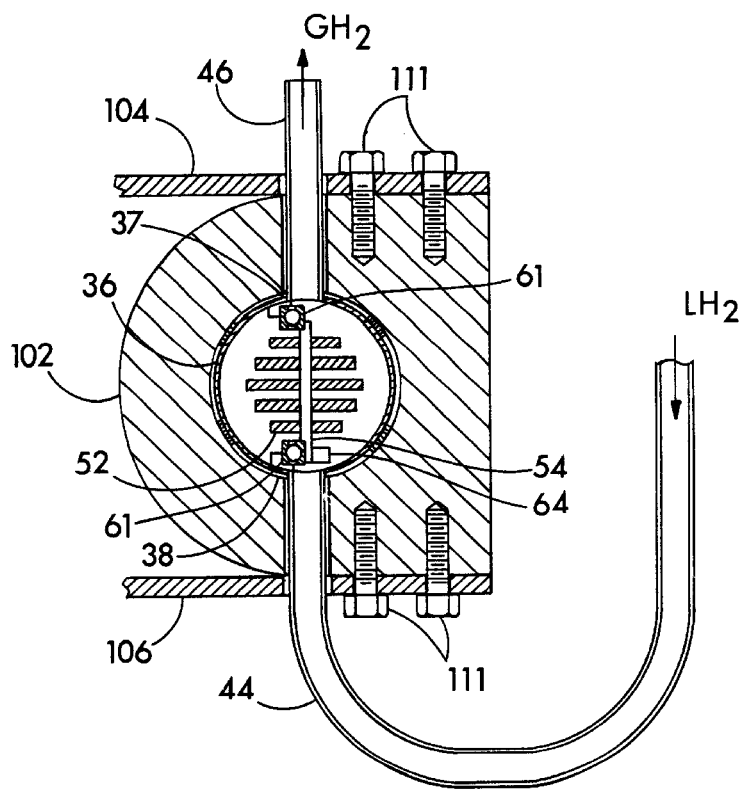
FIG. 7 is a cross-section view along line 7—7 of FIG. 4.
Figure 8:
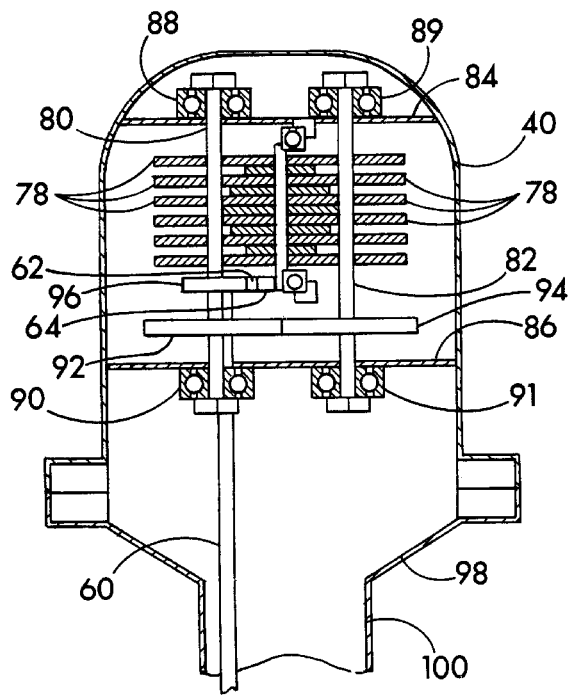
FIG. 8 is a cross-section view along line 8—8 of FIG. 4.
Figure 9:
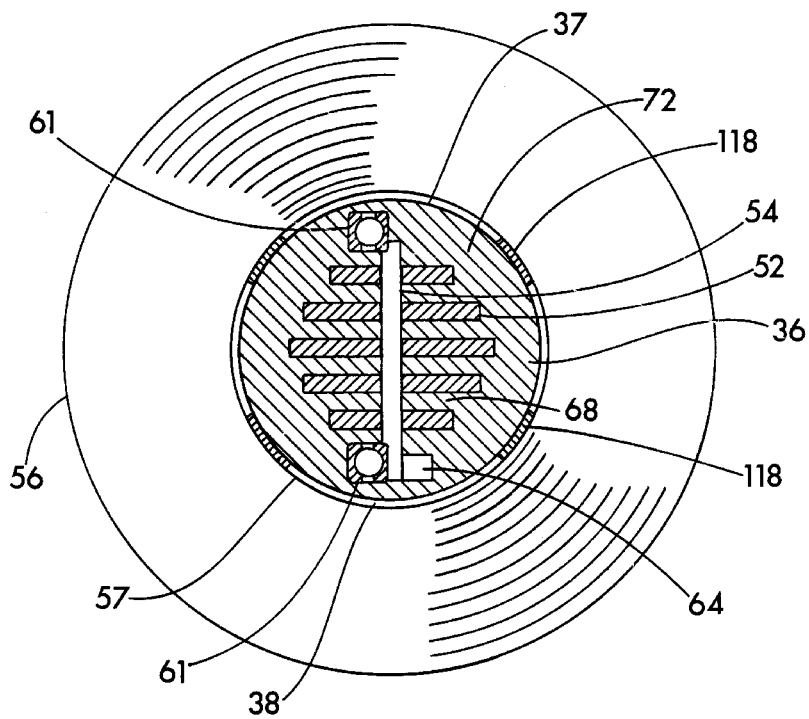
FIG. 9 is a cross-section view along line 9—9 of FIG. 4.

FIG. 3 is a perspective view of the hydrogen slushifier magnetic refrigerator 30, with various parts being cut away for illustrative purposes. The slushifier refrigerator 30 utilizes the magnetocaloric effect, by which certain magnetic materials increase in temperature when placed in a magnetic field and decrease in temperature when removed from the field. In the case of the present invention, a magnetic wheel 50 positioned within the housing 36 has fins 52 of paramagnetic or ferromagnetic material attached to a rim 54, which is preferably composed of a material which is a poor heat conductor at cryogenic temperatures, for example, titanium alloys or stainless steel. The depiction of FIG. 3 shows a portion of the wheel 50 cut-away to show the profile of the wheel 50 and the associated rim 54 and fins 52, though it is understood that the wheel 50 forms a complete circle within the housing 36. Suitable paramagnetic and ferromagnetic materials are described in U.S. Pat. No. 4,408,463 to Barclay, the disclosure of which is incorporated herein by reference. Gadolinium gallium garnet ($Gd_3Ga_5O_{12}$) is a preferred material for the fins 52 in that it has satisfactory magnetocaloric effect properties at low cryogenic temperatures. The fins 52 are in a stacked spaced relation, as depicted in FIGS. 3, 7, 8, and 9, though other geometries are possible. The fins 52 are tightly held in slots (not shown) in the rim 54. The fins 52 may be press fit into the slots and bonded therein using a liquid adhesive (e.g., a filled epoxy). A magnetic field is produced by toroidally arranged magnets having a hollow bore 57 around which the magnet coils are wound, the housing 36 being contained within the bores 57 of the magnets 56 and the magnetic wheel 50 rotating within the housing 36 through the magnetic field created by the magnets 56. Magnetic field geometries other than the one herein described are possible as well. A number of the magnets 56 have been removed from the perspective view of FIG. 3. The bottom cross-sectional view of FIG. 4 shows a preferred layout of the magnets 56. The magnetic field varies at different points about the circumference of the housing 36, there being no magnetic field in the area of the removal chamber 40, and a peak magnetic field in an area just beyond the manifolds 44 and 46, moving clockwise. In areas between the zones of no magnetic field and maximum magnetic field, there are intermediate field levels. The magnetic wheel 50 is driven by a motor 58 (shown schematically in FIG. 1) located outside of the vacuum insulated tank 12. As best shown in FIGS. 4 and 8, the motor 58 turns a drive shaft 60 which enters the vacuum insulated tank 12 through seals (not shown) at the bottom 16 and extends into the housing 36, the drive shaft having a pinion gear 62 that mates with a flange ring gear 64 which is affixed on the rim 54 of the magnetic wheel 50, as best shown in FIGS. 8 and 9. As illustrated in FIG. 7, the wheel 50 is mounted for rotation upon bearings 61 which extend around the circumference of the wheel 50. The magnetic wheel is rotated so that each point of the wheel is repeatedly magnetized and demagnetized. Though the present invention is oriented for clockwise rotation of the wheel, it is possible to construct a magnetic slushifier refrigerator utilizing counter-clockwise rotation.

Figure 5:
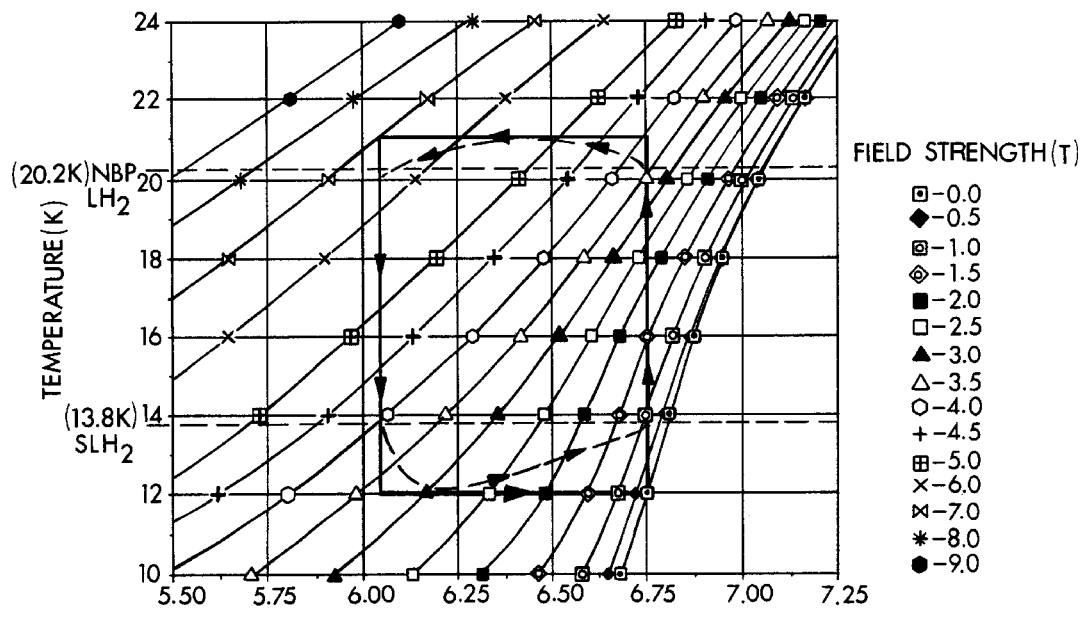
FIG. 5 is a plot of temperature (K) versus entropy (S/R) and magnetic field strength (T) for gadolinium gallium garnet and with the cycle for the slushifier magnetic refrigerator superimposed, the ideal Carnot cycle being shown in a solid line and the predicted actual cycle shown in a dashed line.
Figure 6:
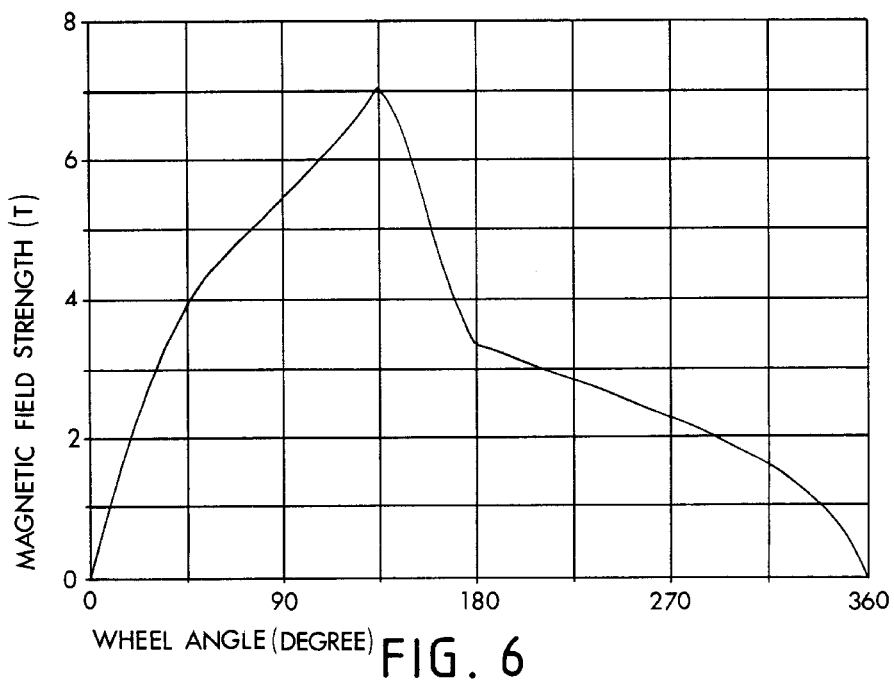
FIG. 6 is a plot of magnetic field strength (T) versus wheel angle for the slushifier magnetic refrigerator, where zero field strength and a zero degree position is at the position of the solid hydrogen scrapers.

The magnetization and demagnetization of a particular point on the magnetic wheel 50 upon rotation through the housing 36 follows a magnetic Carnot cycle, as depicted in FIG. 5 which shows the temperature plotted against entropy and magnetic field strength for gadolinium gallium garnet. The ideal Carnot cycle path of a particular point on the magnetic wheel 50 as the point rotates through the housing 36 is shown as a solid line in FIG. 5; the actual, non-ideal Carnot cycle path is shown as a dashed line. FIG. 6 shows an exemplary magnetic field profile as a function of angular position about the wheel. The field profile of FIG. 6 is derived from the temperature-entropy curve of FIG. 5 and depends on the magnetic field strength of the magnets 56 and the magnetic material used in the magnetic wheel 50. Both FIGS. 5 and 6 can be correlated to positions on the circumference of the housing 36. At the position marked "A" in FIG. 4, the magnetic wheel 50 is subjected to zero magnetic field, the temperature is near but less than 13.8 K, and the pressure is 1 atmosphere. The exact temperature here and at other points in the cycle depends on parameters such as rotation rate, the quality of slush in the tank, and the magnetic field strength. Position "A" is contained within the removal chamber 40. In FIG. 5, position "A" is located at the lower right-hand corner of the Carnot cycle path and in FIG. 6 is at 0° displacement about the wheel.

Moving immediately clockwise from the removal chamber 40, the magnetic wheel 50 enters an adiabatic section 66 of the housing 36. FIG. 9 shows an exemplary cross-section through an adiabatic section of the housing 36. The adiabatic section 66 prevents heat transfer to or from the magnetic wheel 50 by closely surrounding the wheel with stationary insulative plates 68 that interleave with the rings 52 of the magnetic wheel 50. The adiabatic section 66 is formed of a material that is a poor heat conductor at cryogenic temperatures and has good structural properties. Stainless steel (e.g., 310 stainless steel) is found to be a particularly advantageous material for the adiabatic section 66 since it has excellent structural strength but is a relatively poor conductor of heat at temperatures near absolute zero, and this serves to insulate the rings 52 of the magnetic wheel 50. Other suitable materials, such as titanium alloy (e.g., Ti—6Al—4B), or composites (e.g., fiberglass epoxy, G-10) may also be used in the adiabatic section 66.

Returning to FIG. 4, as the wheel continues through the adiabatic section 66 to position "B," the magnetic field reaches about 3.8 Tesla and the temperature of the magnetic wheel 50 in this region will increase to above but near 20.2 K. Position "B" is represented at the upper right-hand corner of the cycle path in FIG. 5 and is at slightly less than a 45° wheel angle. At position "C," the magnetic wheel 50 experiences a magnetic field intermediate between 3.8 and 7 Tesla, and the magnetic wheel 50 enters a boiler section, or region of high temperature heat transfer. The magnetic wheel 50 is no longer enclosed by the adiabatic section 66 in this region; rather, the housing 36 is hollow, having a pressure of 1 atmosphere, and forms an open chamber 70 which allows liquid hydrogen to flow around the fins 52 of the wheel 50 where it is evaporated by heat transfer from the magnetic material. FIG. 7 shows a cross-section view through the housing 36 that depicts the open chamber 70. Liquid hydrogen enters the open chamber 70 of the housing 36 from the insulated inlet pipe 42 via the manifold 44. Gaseous hydrogen is vented off through the manifold 46 leading to the insulated outlet pipe 48 that leads to the upper compartment 24. As the wheel 50 rotates to position "D," the magnetic field increases to about 7 Tesla, but the temperature of the wheel 50 is constant at about 20.2 K due to the heat transfer by the boiling of the hydrogen. The gaseous hydrogen that escapes up the insulated pipe 48 is therefore replaced by liquid hydrogen that flows down the insulated pipe 42. FIG. 7 shows a cross-section in the area of position "D" that cuts through the manifolds 44 and 46, showing the open chamber 70. Continuing clockwise in FIG. 4, the magnetic wheel 50 enters a second adiabatic section 72 at position "E," where the temperature decreases from about 20.2 K as the magnetic field decreases from near 7 Tesla. The beginning of the adiabatic section 72 correlates to the upper left-hand corner of the Carnot cycle path of FIG. 5 and a wheel angle of approximately 135° in FIG. 6. FIG. 9 represents a cross-section through the second adiabatic section 72. Like the adiabatic section 66, the second adiabatic section 72 has stationary insulative plates 68 that interleave with the rings 52 to prevent heat transfer to or from the magnetic wheel 50. Again returning to FIG. 4, position "F" represents an area of magnetic field decreasing to about 3.4 Tesla and temperature decreasing to less than 13.8 K. Position "F" is the lower left-hand corner of the cycle path of FIG. 5 and represents a wheel angle of about 180°. Continuing clockwise to position "G," the magnetic wheel 50 enters a second open chamber 74, where the housing 36 is again hollow and the pressure is 1 atmosphere. The second open chamber 74 is a solidifier section, or region of low temperature heat transfer, wherein liquid hydrogen is introduced through the inlet 39 and freezes directly upon the magnetic wheel 50. Position "H" represents an area of decreasing magnetic field upon continued rotation of the magnetic wheel 50. Throughout the second open chamber the temperature of the magnetic wheel 50 remains constant despite decreasing magnetic field because of heat transfer by freezing of the hydrogen upon the wheel 50. The solid hydrogen then enters the removal chamber 40 where the hydrogen is scraped off of the wheel 50 by scrapers 76 and is allowed to fall freely into the lower compartment 26. In FIG. 5, the Carnot cycle path has returned to its lower right-hand corner and the wheel cycle of FIG. 6 is 360°, equivalent to 0° position. On continued rotation, the cycle is repeated.

As shown in FIGS. 4 and 8, a preferred embodiment of the scrapers 76 includes two sets of circular plates 78 in stacked spaced relation, the circular plates 78 being mounted for rotation on at their axes on shafts 80 and 82 so as to interleave with the rings 52 of the magnetic wheel 50. The shaft 80 and the shaft 82 are mounted between an upper shelf 84 and a lower shelf 86 in the removal chamber 40 on bearings 88, 89, 90, and 91. The shafts 80 and 82 have gears 92 and 94, respectively, that mate to turn the two sets of circular plates 78 simultaneously. The pinion gear 62 that is driven by the motor 58, and which turns the wheel 50 via the ring gear 64 also turns a gear 96 that is mounted on the shaft 80. Through the meshing of gears 62 and 96, 92 and 94, and 62 and 64, the wheel 50 and the circular plates 78 will rotate in tandem. FIG. 4 shows the direction of rotation of these gears; the circular plates 78 are driven to rotate against the direction of wheel rotation. As illustrated in FIG. 8, the interleaving of the circular plates 78 with the rings 52 scrapes the solid hydrogen off the wheel, which falls freely through a bottom 98 in the removal chamber 40. The bottom 98 is funnel-shaped and tapers to a wide tube 100 that leads to the lower chamber 26, where the solid hydrogen is mixed with slush or liquid hydrogen that is already contained within the lower chamber 26. For maximum efficiency, hydrogen must be prevented from clinging to the wheel 50 and entering the adiabatic section 66 after passage through the removal chamber 40. A flexible clearance screen or filter (not shown) may be used between the removal chamber 40 and the adiabatic section 66 to keep the loose solid hydrogen in the removal chamber 40 from entering the first adiabatic section 66 and redepositing on the wheel 50. To work effectively, the screen or filter must be shaped to fit around the fins 52 that are attached to the wheel 50. In addition, a flexible clearance seal (not shown) may be located between the removal chamber 40 and the first adiabatic section 66. The purpose of the seal is to keep the loose solid hydrogen out of the adiabatic section 66 and also to limit the flow of liquid hydrogen as well. To work effectively, the seal must be shaped to fit around the fins 52 that are attached to the wheel 50.

As described above, the magnets 56 are troidally arranged about the housing 36 such that the housing 36 is supported inside the bores 57 of the magnets 56. As shown in FIGS. 4 and 7, the magnets 56 are separated by wedge-shaped spacers 102 that are thermally conductive, and the spacers 102 are mounted to thermally conductive magnet support discs 104 and 106, above and below the magnets 56, respectively, to locate them. The magnetic field is caused to vary about the circumference of the housing 36 by varying the number of windings from magnet to magnet. The magnets 56 are preferably superconducting and are maintained at a temperature near 6 K in a manner to be discussed to maintain a persistent superconducting mode. One suitable material for the superconducting coils is niobium-3 tin ($Nb_3Sn$). Current can be provided to the coils of the magnets 56 in various ways, for example, by utilizing a flux pump apparatus (not shown). An example of a suitable flux pump system is described in the article entitled "Automated Flux Pump for Energizing High Current Superconducting Loads," Rev. Sci. Instrum., Vol. 46, No. 5, May 1985, pp. 582–585, incorporated herein by reference.

As noted above, the housing 36 is made of solid stainless steel (or suitable substitute) in the regions of the first adiabatic section 66 and second adiabatic section 72 (see FIG. 9). In the areas of the first and second open chambers 72 and 74, the housing is made of stainless steel tubing 116, the boundary of which defines the open chambers 72 and 74. (see FIG. 7). The housing 36 is supported inside the bores 57 of the toroidally arranged magnets 56 by low conductance stand-offs 118. The removal chamber 40 depicted in FIG. 8 is larger than the rest of the housing 36 and will not fit within the bores 57 of the magnets 56, though there are no magnets 56 in the area of the removal chamber 40. The removal chamber 40 is defined by a thin wall of stainless steel. The lower conductive magnet support disk 106 is mounted to a support structure 120 for the entire slush hydrogen production device 10. Around the slushifier 30 between the upper partition 28 and lower partition 29, open space not occupied by any of the mechanical fixtures is, evacuated by a vacuum pump through a port 122 so that the slushifier magnetic refrigerator 30 is insulated from the environment and so that the different parts of the slushifier assembly 27 are insulated from each other. A second, smaller magnetic refrigerator 108 is preferably used to keep the magnets 56 of the magnetic slushifier 50 and the magnets of the second magnetic refrigerator 108 at a temperature near 6 K. Generally, a cooling power of 2 Watts or less is sufficient to keep the magnets 56 cold. The second magnetic refrigerator 108 preferably operates in an analogous manner to the magnetic slushifier, having a magnetic wheel passing through a magnetic field of varying intensity. An example of a suitable magnetic refrigerator is shown in U.S. Pat. No. 4,702,090, to Barclay, et al., the disclosure of which is incorporated herein by reference. The second magnetic refrigerator 108 has a high temperature heat transfer region and a low temperature heat transfer region. The low temperature heat transfer region of the second magnetic refrigerator 108 is used to keep its magnets and the magnets 56 cool, rather than create slush as the low temperature heat transfer region of the slushifier refrigerator 30 does. The upper conductive support disk 104, the lower conductive support, disk 106, and the spacers 102 conductively link the magnets 56 together; the upper conductive support disk 104 is then linked to a heat extractor on the low temperature heat transfer region of the second magnetic refrigerator 108 by an insulated conductive rod 110. As shown in FIGS. 3 and 7, bolts 111 are used to attach the spacers 102 to the upper and lower conductive support disks 104 and 106. For heat rejection in the second magnetic refrigerator 108, a heat extractor in the high temperature heat transfer region of the second magnetic refrigerator 108 is conductively linked by an insulated conductive rod 112 to a heat exchanger 114 located in the upper compartment 24. Heat is transferred away from the hot end of the second magnetic refrigerator by liquid hydrogen in the upper compartment 24 in the heat exchanger 114. A drive shaft 115 transfers drive power from the slushifier magnetic refrigerator 30 to the second magnetic refrigerator 108.

Parts of a slush hydrogen production device 10 such as the upper conductive support disk 104, the lower conductive support disk 106, the wedge-shaped spacers 102, the insulated conductive rod 110, the insulated conductive rod 112, and other such parts that are to be thermally conductive are formed of a solid material which is a good heat conductor at the temperature of operation of the refrigerator and provide a continuous heat transfer path through the solid. For example, at cryogenic temperatures between 2 K and 20 K, highly refined copper (e.g. OFHC copper certified grade No. 101) has been found to be an excellent heat conductor and is preferably the material of which the thermally conductive parts are formed. Very high purity aluminum may also be utilized for cryogenic operation if desired, and other materials may be used, as appropriate, in other operating temperature ranges. These thermally conducting parts may be formed as a unitary integral structure or may be formed as an assembly of several parts which are welded together to provide a continuous heat transfer path.

In operation, the slushifier magnetic refrigerator 30 receives liquid hydrogen from the upper compartment 24 through the inlet pipe 42 in the open chamber 70, and exhausts the same hydrogen through the outlet pipe 48 as gaseous hydrogen back to the upper compartment 24. Liquid hydrogen from the upper compartment 24 is sent via a connecting channel 124 to fill the lower compartment 26. After cooling by direct contact heat exchange with colder stratified liquid hydrogen, the liquid hydrogen is received through the inlet 39 into the solidifier section 32. After partial solidification, the remaining liquid hydrogen that had been received through the inlet 39 returns to the lower compartment through the removal chamber 40. Serving a function similar to the screen or filter between the removal chamber 40 and the adiabatic section 66, there is a screen or filter 126 located on the inlet 39 to the second open chamber 72. The purpose of the screen or filter 126 is to prevent solid hydrogen that has fallen into the lower compartment 26 from the removal chamber 40 from re-entering the slushifier magnetic refrigerator while permitting the flow of liquid hydrogen. As the slush hydrogen production device operates, liquid hydrogen in the lower compartment 26 becomes a mixture of solid and liquid hydrogen, the ratio of solid to liquid increasing upon continued operation. This process is continued until the hydrogen in the lower compartment 26 becomes the desired consistency of slush. Upon the initial start-up of the slush hydrogen production device 10, the upper compartment 24 and the lower compartment 26 are filled with liquid hydrogen at 20.2 K. A gaseous magnet precooler 127 is used to prime the magnets of the second magnetic refrigerator 108, i.e., cool the magnets of the second magnetic refrigeration 108 to an operating temperature near 6 K to produce the necessary superconductive effect in the windings of the magnets. The magnet precooler 127 comprises a heat exchanger 128 contained in the bath of liquid hydrogen in the upper compartment 24 and a Joule-Thomson expansion valve 130. High pressure helium gas is sent through a line 132 and then through a heat exchanger 129, and the helium gas is cooled to a temperature ranging between 6 K and 20.2 K, depending upon the cooling required for the small magnetic refrigerator 108. Continuing up the line 132, the gaseous helium is then directed through the heat exchanger 129 where heat is transfered to helium that is returning after cooling the magnets, explained below. The second heat exchanger 129 is insulated from the surrounding hydrogen environment in the lower compartment 26. When the helium of the line 132 leaves the second heat exchanger 129, it will be near the temperature of the magnets of the second magnetic refrigerator 108. The helium then passes through the Joule-Thomson expansion valve 130 which causes a pressure and temperature drop. The helium is then circulated through the heat extractor on the low temperature heat transfer region of the second magnetic refrigerator 108 to cool the magnets of the second magnetic refrigerator; the magnets 56 of the magnetic slushifier 30 are then cooled by conduction with the insulated copper rod 110 that links the upper conductive support disk 104 with the heat extractor in the low temperature heat transfer region of the second magnetic refrigerator 108. After circulating through the heat extractor on the low temperature heat transfer region of the second magnetic refrigerator 108 to cool the magnets, the helium gas is removed from the area by a line 134 that returns through the heat exchanger 129 and precools the incoming helium gas below the liquid hydrogen temperature in the upper compartment 24. Once the magnets reach about 6 K, they can be energized to create the necessary magnetic field. After the magnets reach 6 K, the magnetic refrigerator 108 can maintain its own magnets at 6 K as well as cool the magnets 56 of the slushifier to 6 K, so the precooler 127 can be shut off. The slush hydrogen which is produced by the slushifier 30 is then admixed with the 20.2 K liquid hydrogen in the lower compartment 26 until the temperature of the liquid hydrogen in the lower compartment reaches 13.8 K. Continued output of slush hydrogen by the slushifier refrigerator 30 results in an accumulation of slush hydrogen in the lower compartment 26. The slush hydrogen and liquid hydrogen in the lower compartment will generally stratify, leaving the slush hydrogen on the bottom of the lower compartment 26.

Figure 10:
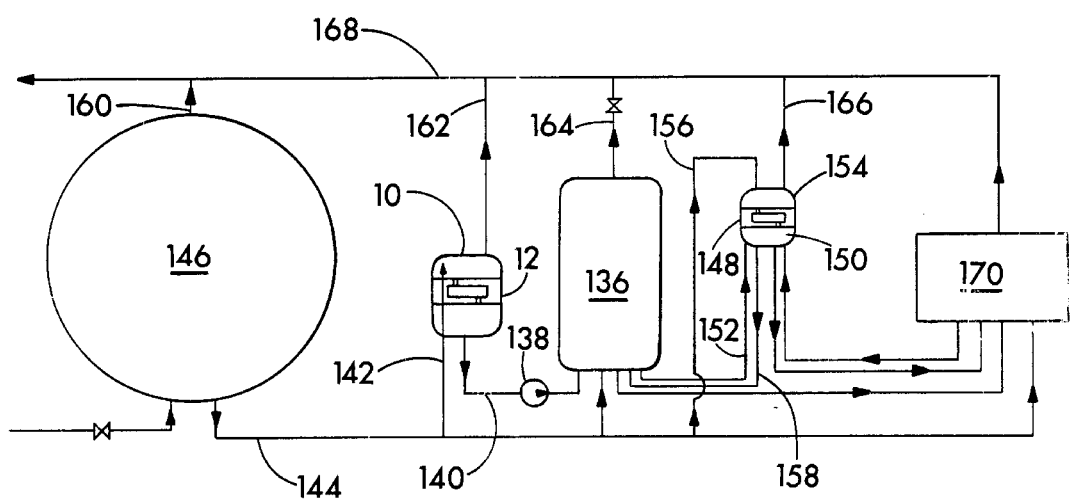
FIG. 10 is a schematic representation of a slush hydrogen production facility in accordance with the invention.

FIG. 10 shows the slush hydrogen production device 10 as a part of a slush hydrogen production facility. When the slush hydrogen in the lower compartment 26 is of the desired consistency, the slush hydrogen may be transferred from the vacuum insulated tank 12 to a slush hydrogen storage tank 136 at a rate equal to the rate at which it is produced. The pipe 124 (shown in FIG. 1) that leads from the upper compartment 24 to the lower compartment 26 allows liquid hydrogen from the upper compartment 24 to pass into the lower compartment 26, replacing the slush that is removed. A pump 138 is used to transfer the slush hydrogen on a line 140 to the slush hydrogen storage tank 136. Liquid hydrogen is fed to the upper compartment 24 of the vacuum insulated tank 12 via a line 142 that branches off of a line 144 originating at a liquid hydrogen storage tank 146. Heat transfer into the slush hydrogen storage tank 136 will cause the ratio of solid to liquid hydrogen to decrease slowly with time. If it is desired to increase the solid to liquid hydrogen ratio in the slush hydrogen storage tank 136, the slush hydrogen production facility may include a slush conditioner 148. The slush conditioner 148 is identical to the slushifier apparatus 10 except for the addition of a slush inlet to a lower compartment 150 of the slush conditioner 148. Slush is received at the slush inlet of the lower compartment 150 of the slush conditioner 148 through a line 152. For start-up of the slush conditioner 148, the lower compartment 150 of the slush conditioner 148 is filled with slush hydrogen and an upper compartment 154 is filled with liquid hydrogen from the liquid storage tank 146 through a line 156 that branches off the line 144. Since the lower compartment 150 is already at the temperature of slush, 13.8 K, the slush conditioner 148 can begin freezing the liquid part of the slush hydrogen in the lower compartment 150, increasing the ratio of solid to liquid hydrogen in the slush hydrogen until the desired consistency of slush hydrogen is reached. At that point, the slush hydrogen in the conditioner 148 begins to be returned to the slush hydrogen storage tank 136 through a line 158 and is replaced at the same rate through a line 152 from the storage tank 136. This process continues until the slush hydrogen in the slush hydrogen storage tank 136 reaches the desired consistency. Gaseous hydrogen may be vented from the liquid hydrogen storage tank 146, the vacuum insulated tank 12, the slush hydrogen storage tank 136, and the slush conditioner 148 through lines 160, 162, 164, and 166, respectively, which merge with a line 168 that leads to a collection unit (not shown). The slush hydrogen production facility may be used to produce slush hydrogen for an aerospace vehicle 170 such as a National Aerospace Plane (NASP), which may be hooked up for fueling as shown in FIG. 10, having the necessary associated inlet and outlet lines to maintain the desired slush consistency before takeoff. The slush hydrogen production facility may also incorporate a portable experimental station (not shown) which may be used to test the consistency of the slush hydrogen in the slush hydrogen storage tank 136 and the slush conditioner 148. The portable experimental station may be used in place of the aerospace vehicle at 170 or, alternately, in addition to the aerospace plane 170.

It is understood that the invention is not confined to the particular construction and arrangement of parts herein illustrated and described, but embraces such modified forms thereof as come within the scope of the following claims.

What is claimed is:

1. A slush hydrogen production device comprising:
   (a) a hydrogen slushifier magnetic refrigerator which has a low temperature heat transfer region and a high temperature heat transfer region, hydrogen being solidified in the low temperature heat transfer region and heat being transferred away from the magnetic refrigerator via gaseous hydrogen in the high temperature heat transfer region;
   (b) means for removing the solidified hydrogen from the low temperature heat transfer region and mixing the solidified hydrogen with liquid hydrogen to form slush hydrogen; and
   (c) means for venting the gaseous hydrogen from the high temperature heat transfer region.

2. The slush hydrogen production device of claim 1 wherein the hydrogen slushifier magnetic refrigerator includes:
   (a) magnetic material which exhibits the magnetocaloric effect mounted for movement into and out of the low temperature heat transfer region and the high temperature heat transfer region; and
   (b) means for producing a magnetic field at a position over a portion of the magnetic material such that each point of the magnetic material can be moved into and out of the magnetic field as the material is moved.

3. The slush hydrogen production device of claim 2 wherein the magnetic material is in the form of a wheel and including means for driving the magnetic wheel in rotation.

4. The slush hydrogen production device of claim 3 wherein the magnetic wheel is comprised of a plurality of flat rings of magnetic material each mounted to a holding rim which maintains the magnetic rings in stacked spaced relation, wherein liquid hydrogen contacts the flat rings of magnetic material in the high temperature heat transfer region and is partially boiled off, and hydrogen solidifies upon the flat rings of magnetic material in the low temperature heat transfer region.

5. The slush hydrogen production device of claim 2 wherein the magnetic material is gadolinium gallium garnet.

6. The slush hydrogen production device of claim 4 wherein the means for removing the slush hydrogen from the low temperature heat transfer region includes a scraper that scrapes the slush from the surfaces of the magnetic rings.

7. The slush hydrogen production device of claim 6 wherein the scraper is a series of cylindrical plates in stacked spaced relation that interleave with the flat rings of magnetic material.

8. The slush hydrogen production device of claim 3 wherein the means for producing the magnetic field includes a plurality of solenoidal coils formed of superconducting windings, the solenoidal coils being wound to create a bore through which the magnetic wheel rotates, the coils being wound such that the magnetic field varies at different points along the circumference of the wheel, the magnetic field being a maximum at the high temperature heat transfer region and a minimum in the low temperature heat transfer region.

9. The slush hydrogen production device of claim 8 wherein the field is varied along the circumference of the wheel by altering the number of windings in the coils at different positions about the circumference of the wheel.

10. The slush hydrogen production device of claim 8 wherein the superconducting windings are formed of $Nb_3Sn$.

11. The slush hydrogen production device of claim 9 further including a second refrigerator operative to bring the solenoidal coils of the hydrogen slushifier magnetic refrigerator to a temperature range required to produce the superconductive effect in the windings and to maintain that temperature.

12. The slush hydrogen production device of claim 11 wherein the second refrigerator is a second magnetic refrigerator having a low temperature heat transfer region and a high temperature heat transfer region, the solenoidal coils of the hydrogen slushifier magnetic refrigerator and the second magnetic refrigerator being linked to the low temperature heat transfer region of the second magnetic refrigerator to produce the superconductive effect in the windings of the hydrogen slushifier magnetic refrigerator and the windings of the second magnetic refrigerator, and including means for transferring heat away from the high temperature heat transfer region of the second magnetic refrigerator.

13. The slush hydrogen production device of claim 12 wherein the solenoidal coils of the hydrogen slushifier magnetic refrigerator and the solenoidal coils of the second magnetic refrigerator are linked together by a rod which is a good conductor of heat at cryogenic temperatures.

14. The slush hydrogen production device of claim 12 wherein the means for transferring heat away from the high temperature heat transfer region of the second magnetic refrigerator is a rod which is a good conductor of heat at cryogenic temperatures that leads to a means for dissipating heat.

15. The slush hydrogen production device of claim 14 wherein the means for dissipating heat is a heat exchanger immersed in a bath of liquid hydrogen.

16. The slush hydrogen production device of claim 8 further including a helium gas precooler that is used to cool the solenoidal coils of the first magnetic refrigerator to superconducting temperatures, the precooler comprising:

(a) a source of high pressure helium gas;

(b) an expansion valve through which the helium gas passes, thereby reducing the pressure and causing the temperature of the helium gas to cool to a temperature required for the superconductive effect in the solenoidal coils of the first magnetic refrigerator; and (c) means for circulating the cooled helium gas about the solenoidal coils of the first magnetic refrigerator.

17. The slush hydrogen production device of claim 16 wherein the precooler further includes a heat exchanger through which the helium gas passes before passing through the expansion valve, the heat exchanger thereby intermediately cooling the helium gas before the cooling of the expansion valve.

18. The slush hydrogen production device of claim 17 wherein the heat exchanger is immersed in a bath of liquid hydrogen, the heat exchanger acting to cool the helium gas to the temperature of the liquid hydrogen.

19. The slush hydrogen production device of claim 1 wherein the hydrogen slushifier magnetic refrigerator is enclosed within an insulated tank having a top and a bottom, and wherein the solidified hydrogen removed from the low temperature heat transfer region is allowed to fall to a bottom section of the vacuum insulated tank containing slush hydrogen.

20. The slush hydrogen production device of claim 19 further including means for pumping the slush from the bottom of the vacuum insulated tank to an independent slush hydrogen storage tank.

21. The slush hydrogen production device of claim 19 further including means for venting the gaseous hydrogen from the high temperature heat extraction region to a collection system outside of the vacuum insulated tank.

22. The slush hydrogen production device of claim 19 including an independent liquid hydrogen storage tank wherein liquid hydrogen is stored and means for feeding the liquid hydrogen therefrom to the hydrogen slushifier magnetic refrigerator to replace the solidified hydrogen produced by the hydrogen slushifier magnetic refrigerator and removed as hydrogen slush and to replace the gaseous hydrogen that is vented from the high temperature heat transfer region.

23. The slush hydrogen production device of claim 19 wherein the insulated tank has an upper partition and a lower partition that divide the tank into an upper compartment and a lower compartment, the insulated tank having a first insulated pipe and a second insulated pipe that connect the upper compartment to the area between the partitions, the hydrogen slushifier magnetic refrigerator being positioned between the upper and lower partitions and wherein the first insulated pipe comprises the means for venting the gaseous hydrogen from the high temperature heat transfer region, and the hydrogen slushifier magnetic refrigerator receiving liquid hydrogen in its high temperature heat transfer region by the second insulated pipe.

24. The slush hydrogen production device of claim 23 including means for venting the gaseous hydrogen from the upper compartment of the insulated tank to a collection system outside of the insulated tank.

25. A slush hydrogen production device comprising:

(a) a hydrogen slushifier magnetic refrigerator which has a low temperature heat transfer region and a high temperature heat transfer region, hydrogen being solidified in the low temperature heat transfer region and heat being transferred away from the magnetic refrigerator via gaseous hydrogen in the high temperature heat transfer region, the hydrogen slushifier refrigerator including;

(1) a magnetic wheel mounted for rotation about a central axis into and out of the low temperature heat transfer region and the high temperature heat transfer regions, the magnetic wheel including a plurality of flat rings of material which exhibits the magnetocaloric effect mounted to a surrounding holding rim which maintains the magnetic rings in spaced relation, and wherein liquid hydrogen contacts the flat rings of magnetic material in the high temperature heat transfer region and is partially boiled off, and hydrogen solidifies upon the flat rings of magnetic material in the low temperature heat transfer region;

(2) means for driving the magnetic wheel about its axis of rotation;

(3) means for producing a magnetic field at a position over a portion of the magnetic wheel such that each point of the magnetic wheel can be moved into and out of the magnetic field as the magnetic wheel is rotated;

(4) means for removing the solidified hydrogen from the rings of magnetic material at the low temperature heat transfer region; and (5) means for venting the gaseous hydrogen from the high temperature heat transfer region;

(b) a first compartment storing liquid hydrogen and means for transferring liquid hydrogen from the first compartment to the high temperature heat transfer region to absorb heat from the magnetic material in that region and be converted to gaseous hydrogen; and (c) a second compartment for containing slush hydrogen which is connected to the hydrogen slushifier refrigerator to receive solid hydrogen produced by the hydrogen slushifier refrigerator and removed by the means for removing.

26. The slush hydrogen production device of claim 25 including means for transfering liquid hydrogen from the second compartment to the low temperature transfer region so that the liquid hydrogen transfers heat to the rings of magnetic material and solidifies.

27. The slush hydrogen production device of claim 25 wherein the material of the magnetic rings is gadolinium gallium garnet.

28. The slush hydrogen production device of claim 25 wherein the means for removing the slush hydrogen from the low temperature heat transfer region including a scraper that scrapes the slush from the surfaces of the magnetic rings.

29. The slush hydrogen production device of claim 28 wherein the scraper is a series of cylindrical plates in stacked spaced relation that interleaves with the flat rings of magnetic material.

30. The slush hydrogen production device of claim 25 wherein the means for producing the magnetic field includes a plurality of solenoidal coils formed of superconducting windings, the solenoidal coils being wound to create a bore through which the magnetic wheel rotates, the coils being wound such that the magnetic field varies at different points along the circumference of the wheel, the magnetic field being a maximum at the high temperature heat transfer region and a minimum in the low temperature heat transfer region.

31. The slush hydrogen production device of claim 30 wherein the field is varied along the circumference of the wheel by altering the number of windings in the coils at different positions about the circumference of the wheel.

32. The slush hydrogen production device of claim 30 wherein the superconducting windings are formed of $Nb_3Sn$.

33. The slush hydrogen production device of claim 30 further including a second refrigerator operative to bring the solenoidal coils of the hydrogen slushifier magnetic refrigerator to a temperature range required to produce the superconductive effect in the windings and to maintain that temperature.

34. The slush hydrogen production device of claim 33 wherein the second refrigerator is a second magnetic refrigerator having a low temperature heat transfer region and a high temperature heat transfer region, the solenoidal coils of the hydrogen slushifier magnetic refrigerator and the second magnetic refrigerator being linked to the low temperature heat transfer region of the second magnetic refrigerator to produce the superconductive effect in the windings of the hydrogen slushifier magnetic refrigerator and including means for transferring heat away from the high temperature heat transfer region of the second magnetic refrigerator.

35. The slush hydrogen production device of claim 34 wherein the solenoidal coils of the hydrogen slushifier magnetic refrigerator and the solenoidal coils of the second magnetic refrigerator are linked together by a rod which is a good conductor of heat at cryogenic temperatures.

36. The slush hydrogen production device of claim 34 wherein the means for transferring heat away from the high temperature heat transfer region of the second magnetic refrigerator is a rod which is a good conductor of heat at cryogenic temperatures that leads to a means for dissipating heat.

37. The slush hydrogen production device of claim 36 wherein the means for dissipating heat is a heat exchanger immersed in a bath of liquid hydrogen.

38. The slush hydrogen production device of claim 30 further including a helium gas precooler that is used to cool the solenoidal coils of the hydrogen slushifier magnetic refrigerator to superconducting temperatures, the precooler comprising:
  (a) a source of high pressure helium gas;
  (b) an expansion valve through which the helium gas passes, thereby reducing the pressure and causing the temperature of the helium gas to cool to a temperature required for the superconductive effect in the solenoidal coils of the hydrogen slushifier magnetic refrigerator; and
  (c) a means for circulating the cooled helium gas about the solenoidal coils of the hydrogen slushifier magnetic refrigerator.

39. The slush hydrogen production device of claim 25 wherein the hydrogen slushifier magnetic refrigerator is enclosed within an insulated tank having a top and a bottom, within which are formed the first and second compartments, and wherein the hydrogen slush removed from the low temperature heat transfer region is allowed to fall into the second compartment of the vacuum insulated tank.

40. The slush hydrogen production device of claim 39 further including a means for pumping the slush from the second compartment of the vacuum insulated tank to an independent slush hydrogen storage tank.

41. The slush hydrogen production device of claim 40 further including means for venting the gaseous hydrogen from the high temperature heat extraction region to a collection system outside of the vacuum insulated tank.

42. The slush hydrogen production device of claim 39 including an independent liquid hydrogen storage tank wherein liquid hydrogen is stored and means for feeding the liquid hydrogen therefrom to the first compartment to replace the hydrogen solidified by the hydrogen slushifier magnetic refrigerator and to replace the gaseous hydrogen that is vented from the high temperature heat transfer region.

43. The slush hydrogen production device of claim 39 wherein the insulated tank has an upper partition and lower partition that divides the tank into the first and second compartments, the insulated tank having a hydrogen slushifier insulated pipe and a second insulated pipe that connect the first compartment to the area between the partitions, the hydrogen slushifier magnetic refrigerator being positioned between the upper and lower partition and wherein the first insulated pipe is the means for venting the gaseous hydrogen from the high temperature heat transfer region, the hydrogen slushifier magnetic refrigerator receiving liquid hydrogen in its high temperature heat transfer region by the second insulated pipe.

44. The slush hydrogen production device of claim 43 including means for venting the gaseous hydrogen from the upper compartment of the insulated tank to a collection system outside of the insulated tank.

45. A slush hydrogen maintenance facility comprising:
  (a) a slush hydrogen production device which comprises:
    (1) a hydrogen slushifier magnetic refrigerator which has a low temperature heat transfer region and a high temperature heat transfer region, hydrogen being solidified in the low temperature heat transfer region and heat being transferred away from the magnetic refrigerator via gaseous hydrogen in the high temperature heat transfer region;
    (2) means for removing the solidified hydrogen from the low temperature heat transfer region and mixing the solidified hydrogen with liquid hydrogen to form slush hydrogen;
    (3) means for venting the gaseous hydrogen from the high temperature heat transfer region;
    (4) an insulated tank which encloses the hydrogen slushifier magnetic refrigerator and having a compartment for slush hydrogen and wherein the solidified hydrogen removed from the low temperature heat extraction region is received into the slush hydrogen compartment of the insulated tank;
  (b) a slush hydrogen storage tank located outside of the insulated tank of the slush hydrogen production device;
  (c) means for pumping the slush hydrogen from the bottom of the insulated tank of the slush hydrogen production device to the slush hydrogen storage tank;
  (d) a liquid hydrogen storage tank located outside of the insulated tank of the slush hydrogen production device;
  (e) means for delivering liquid hydrogen from the liquid hydrogen storage tank to the slush hydrogen production device to replace the slush hydrogen produced by the slush hydrogen production device and to replace the gaseous hydrogen that is vented from the high temperature heat transfer region of the slush hydrogen production device.

46. The slush hydrogen maintenance facility of claim 45 further comprising:
   (a) means for conditioning slush hydrogen in the slush hydrogen storage tank so as to increase the ratio of solid to liquid hydrogen in the slush; and
   (b) a means for transferring slush from the slush hydrogen storage tank to the means for conditioning slush.

47. The slush hydrogen maintenance facility of claim 46 wherein the means for conditioning slush is a second slush hydrogen production device, which comprises:
   (a) a hydrogen slushifier magnetic refrigerator which has a low temperature heat transfer region and a high temperature heat transfer region, hydrogen being solidified in the low temperature heat transfer region and heat being transferred away from the magnetic refrigerator via gaseous hydrogen in the high temperature heat transfer region;
   (b) means for removing the solidified hydrogen from the low temperature heat transfer region and mixing the solidified hydrogen with liquid hydrogen to form slush hydrogen; and
   (c) means for venting the gaseous hydrogen from the high temperature heat transfer region.

48. A method of producing slush hydrogen using a magnetic refrigerator of the type having a magnetic wheel of material which exhibits the magnetocaloric effect mounted for movement, and at least one superconducting magnet coil mounted at a position over a portion of the magnetic wheel such that the material at each point of the magnetic wheel moves into and out of the magnetic field from the coil as the wheel rotates, comprising the steps of:
   (a) inducing a current in the coil to produce a magnetic field;
   (b) rotating the magnetic wheel into and out of the magnetic field to produce regions of low temperature heat transfer and high temperature heat transfer;
   (c) supplying liquid hydrogen to the regions of low temperature heat transfer and to the region of high temperature heat transfer;
   (d) solidifying solid hydrogen in the low temperature heat transfer region on the wheel and venting gaseous hydrogen away from the high temperature heat transfer region; and
   (e) removing the solid hydrogen from the wheel and accumulating the solid hydrogen as slush.

49. The method of claim 48 wherein steps (b), (c), (d), and (e) are repeated until a desired consistency or amount of slush is obtained.

* * * * *